(12) United States Patent
Kim

(10) Patent No.: US 6,799,060 B1
(45) Date of Patent: Sep. 28, 2004

(54) APPARATUS AND METHOD FOR PROVIDING DIALING ANNOUNCEMENT IN A TELEPHONE TERMINAL

(75) Inventor: Kyung-Woong Kim, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/396,271

(22) Filed: Sep. 15, 1999

(30) Foreign Application Priority Data

Sep. 16, 1998 (KR) .......................... 1998-38274

(51) Int. Cl.⁷ .................................................. H04B 1/38
(52) U.S. Cl. .................... 455/563; 455/414.1; 455/567
(58) Field of Search ................. 455/414, 564, 455/563, 566, 553, 567, 74, 74.1, 414.1; 379/52, 67.1, 82, 69, 87, 88.7, 88.11, 357.03, 357.04, 355.01, 355.06, 355.07, 88.03

(56) References Cited

U.S. PATENT DOCUMENTS

| | | | | |
|---|---|---|---|---|
| 3,936,616 A | * | 2/1976 | DiGianfilippo et al. ...... | 455/462 |
| 4,959,850 A | * | 9/1990 | Marui ......................... | 455/563 |
| 5,007,081 A | * | 4/1991 | Schmuckal et al. .......... | 379/354 |
| 5,042,063 A | * | 8/1991 | Sakanishi et al. ......... | 379/88.03 |
| 5,095,503 A | * | 3/1992 | Kowalski ..................... | 455/563 |
| 5,222,121 A | * | 6/1993 | Shimada ................... | 379/88.03 |
| 5,293,418 A | * | 3/1994 | Fukawa ....................... | 455/458 |
| 5,353,330 A | * | 10/1994 | Fujiwara ..................... | 455/563 |
| 5,390,236 A | * | 2/1995 | Klausner et al. .............. | 379/67 |
| 5,404,579 A | * | 4/1995 | Obayashi et al. ............. | 455/74 |
| 5,452,340 A | * | 9/1995 | Engelbeck et al. ...... | 379/88.03 |
| 5,481,595 A | * | 1/1996 | Ohashi et al. ........... | 379/88.27 |
| 5,698,834 A | * | 12/1997 | Worthington et al. ....... | 235/472 |
| 5,765,110 A | * | 6/1998 | Koizumi ..................... | 455/445 |
| 5,826,199 A | * | 10/1998 | Maeda ........................ | 455/563 |
| 6,173,193 B1 | * | 1/2001 | Bright ......................... | 455/563 |
| 6,198,947 B1 | * | 3/2001 | Barber ........................ | 455/563 |
| 6,201,855 B1 | * | 3/2001 | Kennedy ....................... | 379/33 |
| 6,205,329 B1 | * | 3/2001 | Zilberfarb et al. ........ | 455/426.2 |
| 6,236,867 B1 | * | 5/2001 | Todo et al. .................. | 455/563 |
| 6,240,303 B1 | * | 5/2001 | Katzur ....................... | 455/563 |

FOREIGN PATENT DOCUMENTS

| | | | | |
|---|---|---|---|---|
| JP | 58-141060 | * | 8/1983 | |
| WO | WO 97/13381 | | 4/1997 | ............ H04Q/7/20 |

* cited by examiner

*Primary Examiner*—Charles Appiah
(74) *Attorney, Agent, or Firm*—Cha & Reiter, LLC

(57) ABSTRACT

A phone terminal system for checking whether the telephone is off hook, and for outputting a dialing announcement to notify a user to start dialing when the phone is off the hook. The dialing announcement includes a voice message and a character message. When the phone terminal is off-hook mode, the voice message is outputted to a speaker and the character message is shown on a display of the phone terminal.

7 Claims, 2 Drawing Sheets

APPARATUS AND METHOD FOR PROVIDING DIALING ANNOUNCEMENT IN A TELEPHONE TERMINAL

CLAIM OF PRIORITY

This application makes reference to, incorporates the same herein, and claims all benefits accruing under 35 U.S.C. §119 from an application entitled METHOD OF PROVIDING DIALING ANNOUNCEMENT MESSAGE IN TELEPHONE TERMINAL APPARATUS earlier filed in the Korean Industrial Property Office on Sep. 16, 1998, and there duly assigned Serial No. 98-38274.

BACKGROUND OF THE INVENTION

1. Field of the Invention

The present invention relates to a phone terminal apparatus and method for placing a call, is and more particularly, an apparatus and a method for providing a dialing announcement in the mobile phone terminal which is not equipped with a dial tone.

2. Description of the Related Art

In general, wireless telephone terminal apparatuses such as a Wireless Local Loop (WLL) phone and a cellular phone are not provided with a dial tone in comparison to a wired telephone system. As a result, a subscriber cannot know accurately when his or her phone terminal is ready to start dialing of a phone number.

SUMMARY OF THE INVENTION

It is, therefore, an object of the present invention to provide an apparatus and a method for providing audible and visual dialing announcements informing the to start dialing a phone number when the phone terminal is in off-hook position.

In accordance with the present invention, a phone terminal apparatus checks for whether the phone is in off-hook position, and outputs a dialing announcement to notify a subscriber to start dialing when the phone is off the hook. The dialing announcement is produced in two types of forms, a voice message and a character message. When the phone is off the hook, the voice message is outputted from a speaker and character message indicating ready to start dialing the number is displayed on a display unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well known constructions or functions are not described in detail so as not to obscure the present invention.

Figure 1:
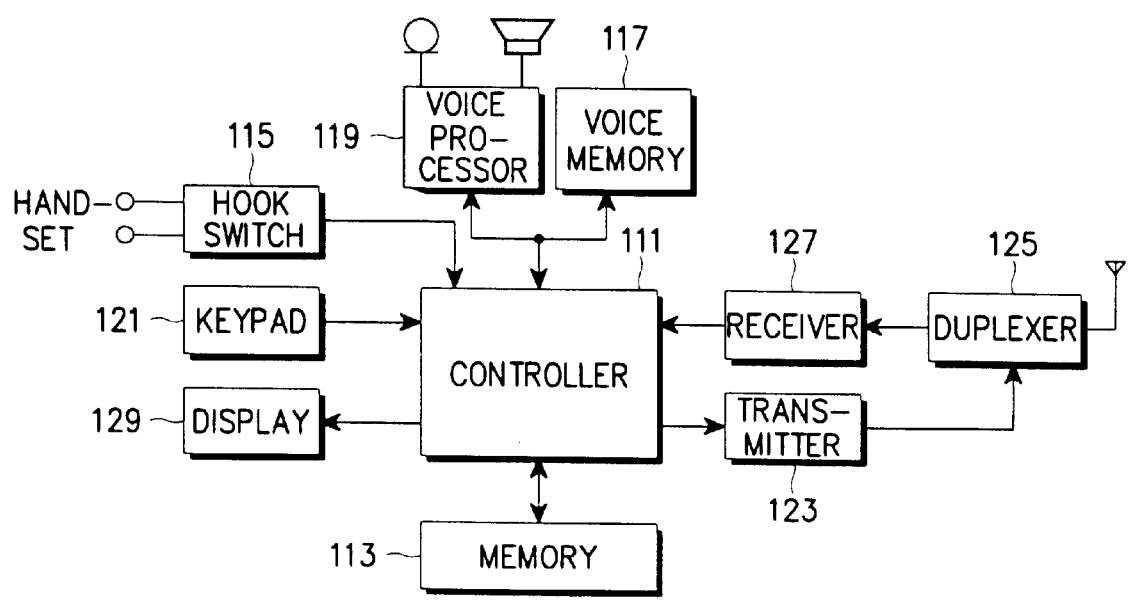
FIG. 1 is a block diagram of a telephone terminal apparatus in accordance with the embodiment of the present invention.

In FIG. 1, an apparatus for providing a dialing announcement is illustrated in accordance with the present invention. There is provided a controller 111 for managing the overall operation of the present invention. A memory 113 coupled to the controller 111 stores a control program for executing operation of the phone terminal and temporarily stores data generated from the controller 111. In addition, the memory 113 stores character message, for an example,"DIAL TELEPHONE NUMBER" which serves to notify a subscriber to start dialing a phone number. The controller 111 periodically scans a hook switch 115 for whether the phone terminal is off the hook position or whether a speaker phone key of the phone terminal is activated. If the hook switch 115 is in the off-hook condition, the controller 111 accesses a voice memory 117 and retrieves a voice message, for an example, "DIAL TELEPHONE NUMBER," stored therein. The voice message is converted to analog signals by a voice processor 119 and outputted through a speaker. Also, the voice processor 119 serves to convert the analog signal received through a microphone from the subscriber into digital signals. The voice processor 119 has a speaker phone function and coupled to the controller 111 and the voice memory 117.

After outputting the voice message to alert the subscriber to start dialing, the controller 111 accesses the memory 113 to display the character message on a display 129. The display 129 is coupled to the controller 111 and serves to display many different types of messages generated from the controller 111 on a liquid crystal display (LCD), including the character message and number dialed by the user.

The controller 111 scans a keypad 121 at a prescribed period to see if the subscriber initiated any key entry. Upon detecting key entry, the controller 111 checks whether the entered key is for dialing a phone number or not. If it is for dialing a valid phone number, the controller 111 supplies the key signal generated by the keypad 121 to a transmitter 123. Then, the transmitter 123 modulates the received key signal into a radio signal to be transmitted to a duplexer 125. The duplexer 125 transmits the received radio signal via an antenna, and also serves to receive incoming radio signal through the antenna and supplied the incoming radio signal to a receiver 127. The receiver 127 demodulates the incoming radio signal received from the duplexer 125 and provides the demodulated signal to the controller 111.

In sum, the phone terminal outputs the voice message and displays the character message upon sensing when the phone terminal is off the hook via the hook switch 115.

Figure 2:
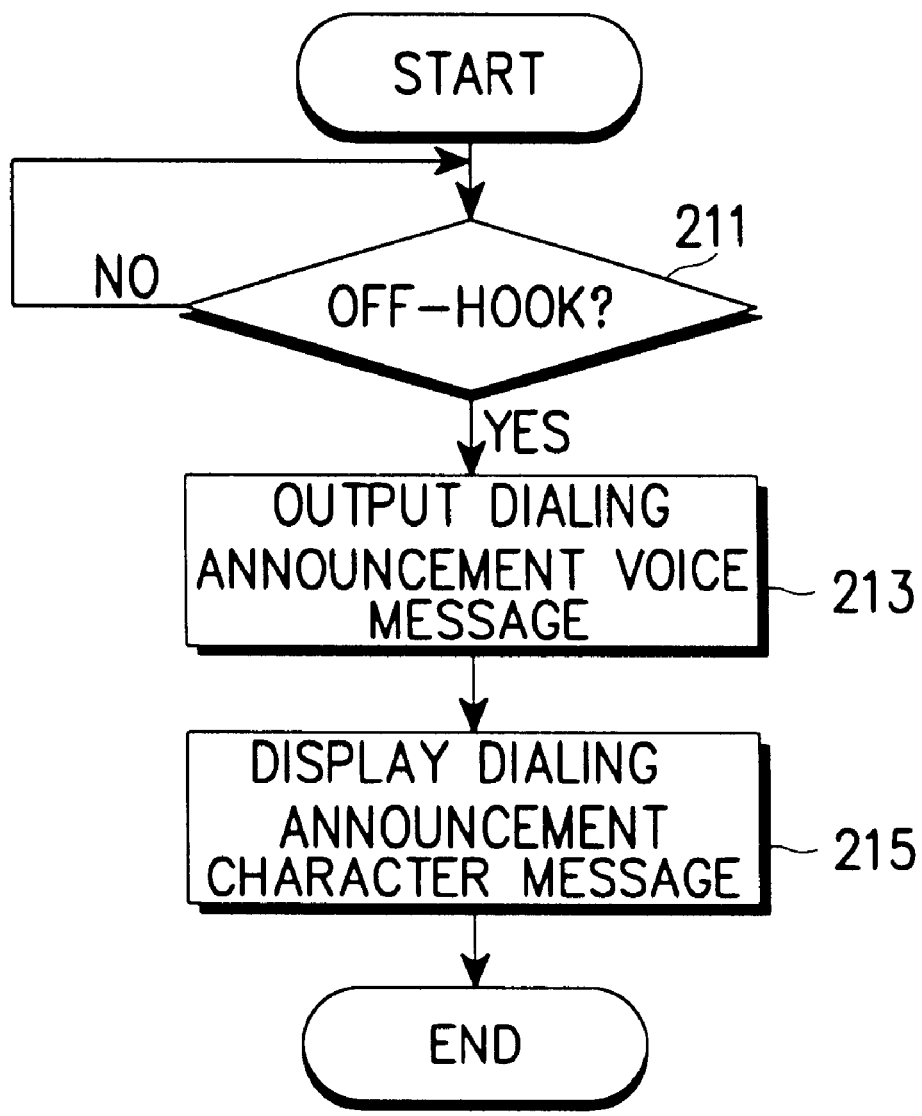
FIG. 2 is a flow chart showing a procedure for providing a dialing announcement according to a preferred embodiment of the present invention.

In FIG. 2, a process for providing a dialing announcement is illustrated. In step 211, the controller 111 periodically checks whether the hook switch 115 is in an off-hook. Upon detecting the off-hook mode, the controller 111 outputs the voice message, for example,"DIAL TELEPHONE NUMBER" stored in the voice memory 117 serving as an equivalence of a dial tone in a conventional wired telephone unit. In step 213, the voice processor 119 converts the voice message stored in the voice memory 117 into analog signal and outputs the converted analog dialing announcement voice message via the speaker. In step 215, the controller 111 then accesses the memory 113 to retrieve the character message to show on the display 129. The controller 111 stops outputting the both the voice message and the character message on the display 129 when the initiates entering a number on the keypad 121.

As shown in the above, when the phone terminal is off the hook position, the voice message is outputted to the speaker and the character message is shown on the display to alert the to start dialing his or her intended phone number. In essence, the dialing announcement in both the voice and character messages serve similar function as a dial tone of the existing wired telephone. As a result, when attempting a call using the mobile terminal which does not provide a dial tone, the subscriber can be informed accurately when to start dialing.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method used in a mobile terminal of the type having a display and a key pad for providing a dialing announcement to alert a user to start dialing a phone number in said key pad when the mobile terminal is in an off-hook mode that is ready to accept dialing, said method comprising the steps of:

storing voice message in a voice memory;

storing data messages in a data memory;

monitoring whether the mobile terminal is in the off-hook mode;

outputting said voice message to notify a user to start dialing if said cellular terminal is in the off-hook mode; and, displaying one of said data messages on said display that notifies a user to start dialing of the mobile terminal after outputting said voice message.

2. The method as set forth in claim 1, further comprising the step of stopping the display of said data message upon sensing entry of data on said key pad by the user.

3. The method as set forth in claim 1, further comprising the step of stopping the announcement of said voice message upon sensing entry of data on said key pad by the user.

4. An apparatus used in a cellular phone system for providing a dialing announcement including a voice message and a character message to alert a user to start dialing a phone number when a cellular terminal is off-hook mode, said apparatus comprising:

a display coupled to said cellular terminal for displaying said character messages;

a key pad for initiating a phone number;

a memory for storing character messages;

a voice memory for storing audio messages; and, a controller for retrieving said audio messages from said voice memory when said cellular terminal is in the off-hook mode, said controller coupled to said display and said memory, for retrieving from said memory at least one character message that notifies a user to start dialing and for displaying said retrieved character message by said display, said controller coupled to said key pad for stopping said voice messages and said at least one character message to be outputted when a user touches a keypad of the mobile telephone.

5. The apparatus as set forth in claim 4, wherein said apparatus further comprises a voice processor for converting said stored audio messages into analog signals and for outputting said converted audio messages to a speaker.

6. The apparatus as set forth in claim 5, wherein said apparatus further comprises a transmitter coupled to said controller for modulating key signals from said key pad into a radio signal;

a duplexer coupled to said transmitter for receiving said modulated radio signal from said transmitter and transmitting said received radio signal via an antenna, and a receiver coupled to said duplexer for demodulating the incoming radio signal from said antenna via said duplexer and for providing said demodulated incoming signal to said controller.

7. The apparatus as set forth in claim 4, wherein said apparatus further comprises a hook switch coupled to said controller for sensing when said cellular terminal is in the off-hook mode.

* * * * *